April 23, 1968  R. E. BROWN  3,379,312
FLUID STRAINERS
Filed March 16, 1965  3 Sheets-Sheet 1
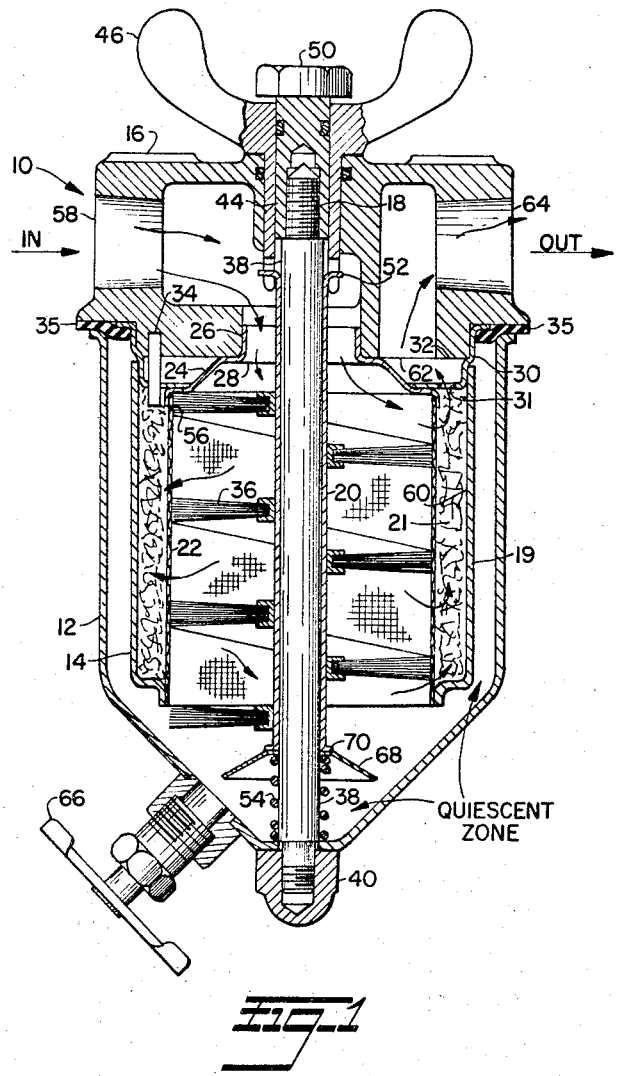
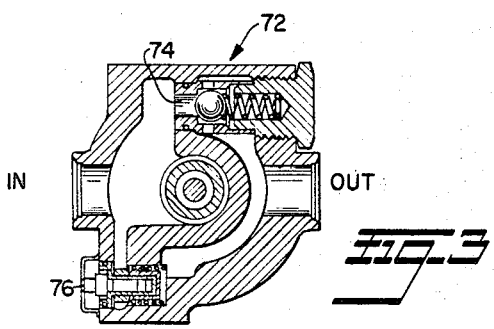
INVENTOR
RICHARD E. BROWN
ATTORNEYS

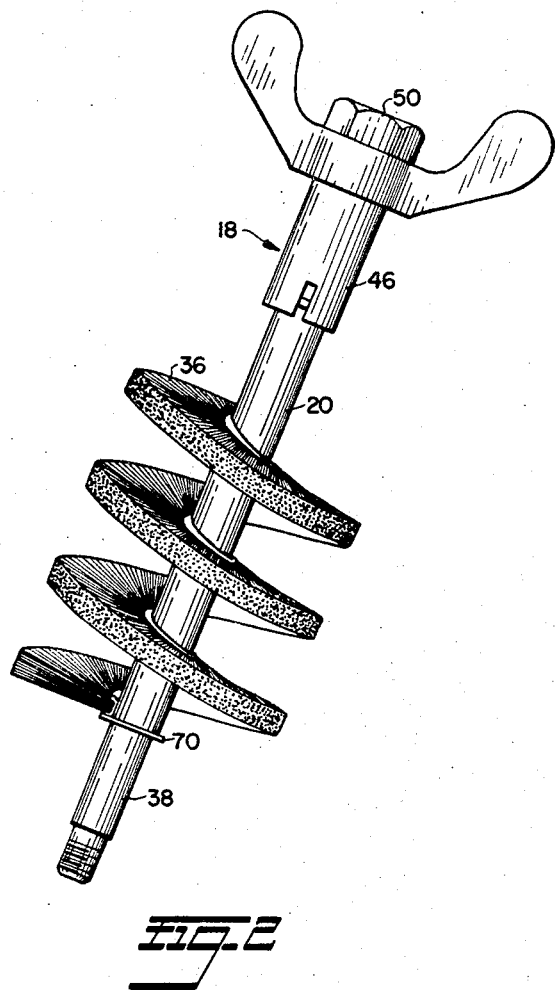

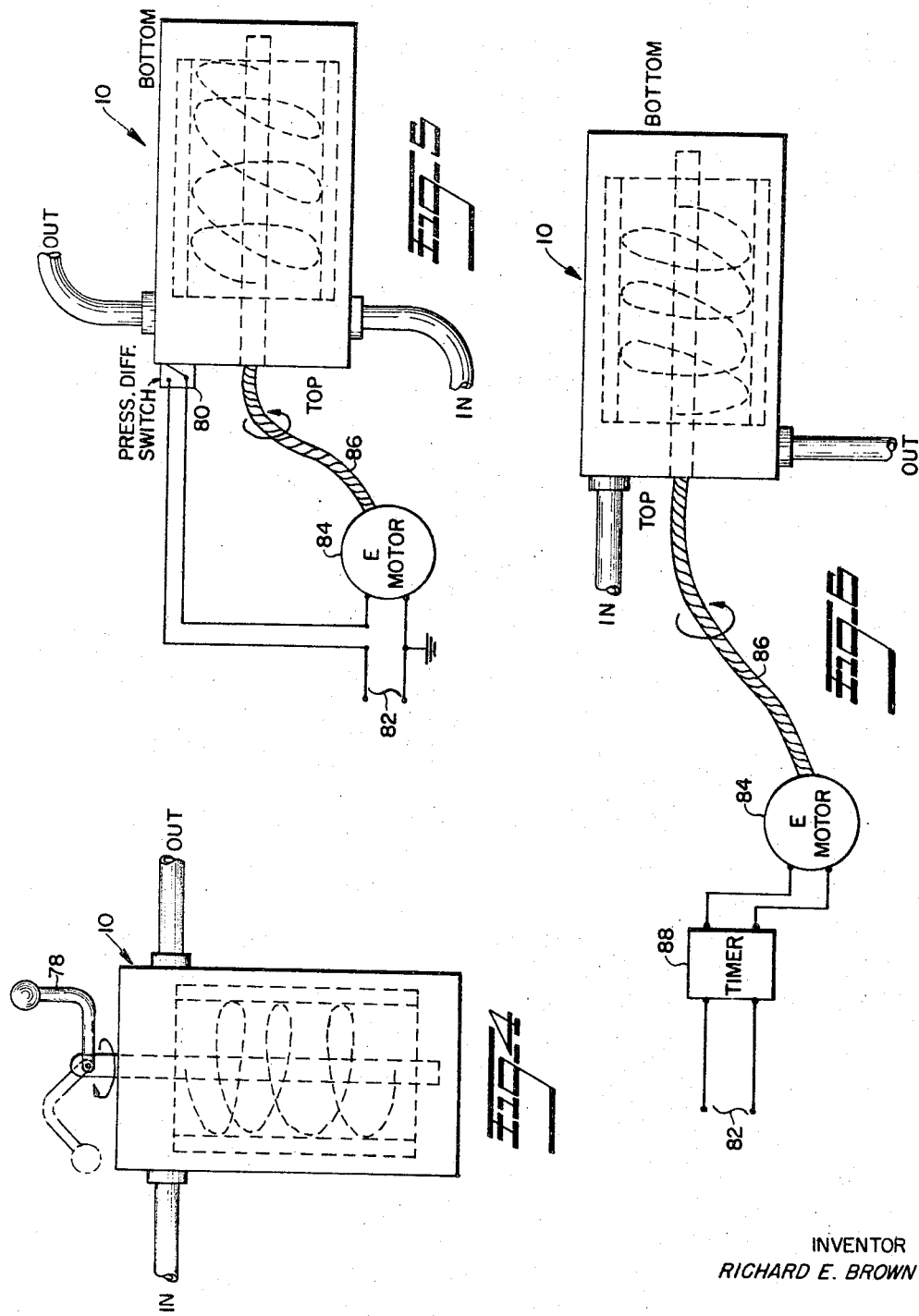

United States Patent Office 3,379,312
Patented Apr. 23, 1968

3,379,312
FLUID STRAINERS
Richard E. Brown, Lyndhurst, Ohio, assignor to North American Rockwell Corporation, a corporation of Delaware
Filed Mar. 16, 1965, Ser. No. 440,095
2 Claims. (Cl. 210—415)

ABSTRACT OF THE DISCLOSURE

A fluid filter assembly comprises an annular generally cylindrical filter unit within which is rotatably mounted a helical brush adapted to scrape the inner filter area in one revolution. The fluid is introduced into the interior of the filter unit, and contaminant removed by the brush falls into a chamber in the bottom of the assembly out of the direct flow path through the assembly. Rotation of the brush may be controlled either by a pressure operated switch responsive to clogging of the filter or an automatic timer.

The present invention refers to fluid strainers or filters and more particularly to on-the-line cleanable fluid strainers or filters.

It has long been recognized that removal of contaminants from the fluid used in hydraulic and lubrication systems particularly in such systems as hydrostatic transmissions, hydraulic control circuits, and airplane hydraulic and lubrication systems, greatly enhances equipment efficiency and life and the usable life of circulating fluid. Filter assemblies of many designs have come into widespread use. Collection of the contaminant within the filter tends to retard fluid flow, causes pressure drops in systems where hydraulic pressure levels may be critical, and reduces or negates the ability of the filter to perform its cleaning function. Thus, most of these many filter units require either temporary removal of the contaminant laden filter element for cleaning or periodic replacement of the filter element. To effect scheduled cleaning by removal or replacement of the filter element, it is necessary to shut down equipment having such filter units. Regardless of the care exercised in the removal or replacement of the filter or strainer, some air is introduced into the hydraulic system, which, in such closed systems as airplane hydraulic control systems or hydrostatic transmissions, necessitates bleeding of lines thereby extending the equipment downtime.

Certain prior filters also include a scraper for periodically removing the contaminant from one side of a filter screen. While some of these devices have proved useful they have not been wholly satisfactory chiefly because they do not provide sufficient protection against reentrainment of the contaminant.

With the foregoing in mind it is an important object of the present invention to provide improved cleanable-on-the-line filters or strainers which minimize equipment downtime caused by removal for cleaning or replacement of the strainer element.

It is a further object of this invention to provide such filters including means for directing freed contaminant within the filter assembly from the fluid flow zone down to a no-flow zone from which it can be removed without interfering with the normal flow of fluid within the filter.

Another object resides in providing improved filters including means for preventing reentrainment of contaminant in the fluid once it has been removed to the quiescent zone.

Still a further object of the invention is to provide improved filters which eliminate the possibility of introducing air within a closed hydraulic system when the filter element is being cleaned and to minimize the entry of air into the system when the contaminant is removed.

Other objects and novel features will become evident or will be specifically pointed out by the following description in connection with the appended drawings in which:

FIGURE 1 is a central section of the filter assembly taken along a plane passing through its vertical axis;

FIGURE 2 is an isometric projection of the helically wound brush;

FIGURE 3 is a horizontal section of an alternate head assembly for use with the filter unit;

FIGURE 4 illustrates an alternate handle member arrangement; and

FIGURES 5 and 6 are schematic diagrams depicting an automatic and non-manual means of operating the filter unit.

With particular reference to FIGURES 1 and 2, the cleanable-on-the-line filter assembly 10 includes a metal housing 12 which encloses a cylindrical filter element 14, both of which are secured to a filter head 16 by a center bolt-nut arrangement 18 disposed within a brush-carrying tube 20. The filter element 14 comprises an outer imperforate housing 19, an intermediate annular porous filter mass 21 and a cylindrical screen cloth 22 which may be of the type disclosed in Behlen Patent No. 2,423,547. Such screens have a surface which has been flattened or smoothed by rolling or calendering and is easily cleaned by brushing. The screen cloth extends throughout the height of the filter element and is secured by weld or press fit to an adaptor 24, which, from its narrow neck 26, spreads diagonally and outwardly from head aperture 28 to encircle the outer circumference of screen cloth 22. Flange 30 having an outlet opening 31 is spot-welded or otherwise attached to the adaptor 24 to adapt the filter element to fit snugly around circular base 32 of the filter head. Pin 34, which extends through the flange into the filter head, prevents rotation of the filter element during the cleaning operation which will be subsequently described. Gasket 35 seals the assembly.

A continuous strip brush 36 shown separately in FIGURE 2 is permanently helically wound around the tube 20. The brush filaments, which are sized and disposed such as to be in contact with the screen cloth cylinder can be made of any of the common filament materials compatible with the fluid, such as, brass, stainless steel, nylon, pig bristle, etc. The brush characteristics are affected by such factors, as the bristle material, the number of helices or turns per unit length, and the amount of deflection produced in the bristles in relation to various screen meshes by the torque applied to turn the brush.

The tube 20 rotates on a spindle 38 which is threaded at both ends. The spindle, which is fastened at the base of container 12 by head nut 40, extends through the tube 20 to an internally threaded shank 44 of bolt 50. A handle member 46 has a depending boss by which it is rotatably mounted coaxially of spindle 38, and the handle member 46 is held in position by nut 50. The shank is slotted at its lower extremity to drivingly engage ears 52 of tube 20 which is biased upward by spring 54 to maintain the drive connection between the handle member 46 and the tube 20. The spring bias also keeps the start of the brush helix at 56 in contact with the top-most surface of the screen cloth cylinder 22 for a purpose to appear.

Normal fluid flow through the filter unit is through inlet port 58 of filter head 16 through aperture 28 into the cylinder defined by the screen cloth 22. Once within this cylinder the fluid will flow spirally downward along the brush helices until it passes through the screen cloth. Flow through the sidewall results in deposition of the contaminants on the inner wall of the screen cloth cylinder. The inner surface of the filter is the "duty side" of the filter. Once through screen cloth the fluid enters an annular area, which may be referred to as the clean side, between the screen cloth and filter element housing 19. Fluid then passes through opening 31 and aperture 62 to outlet port 64.

Since the brush is maintained helically in contact with the inner wall of the screen cylinder, one revolution of the brush will sweep the entire inner surface of the screen cloth. With the filter in its normal attitude, i.e., with the axis of the screen cylinder vertical, gravity and incoming flow force vectors direct the freed contaminant along the brush helices downwardly away from the flow zone to the quiescent zone beneath the filter element. If desired, several turns of the brush may be made to transport the contaminant more rapidly from the upper portion of the screen to the quiescent zone. Thus, it is possible to clean the strainer without removal of the screen cloth cylinder from the filter housing by merely manually rotating the key handle-brush arrangement one or more times. The baffle or deflector 68 mounted between bias spring 54 and the extended ears 70 of the tube 20 greatly extends the intervals between cleaning cycles by preventing reentrainment of the contaminant from the quiescent zone. Draincock 66 is provided at the bottom of container 12 to permit draining the freed contaminant with minimal air entry and downtime.

FIGURE 3 illustrates an alternate filter head 72 which may be utilized with the filter unit. This head assembly 72 embodies a normally closed by-pass valve 74 and a pressure drop indicator 76. The by-pass valve 74 provides a means of routing fluid around the filter element without interrupting flow should it become necessary because of excessive flow rates or blocking of the element due to inadequate servicing. Indicator 76 provides a visual indication of when contaminant deposition on the screen cloth has progressed to the point where cleaning is required. The indicator is set to be triggered when filter element pressure exceeds a predetermined pressure increment.

Filter assembly 10 is illustrated in FIGURE 4 with an alternate handle member 78, the hinged ball and handle arrangement replacing the key arrangement depicted in FIGURE 1.

It is also possible to adapt the filter unit to non-manual brush turning arrangements such as electrical, hydraulic, pneumatic, or remote operated mechanical means. This means may be either automatic or semi-automatic.

With particular reference to FIGURE 5 an automatic electrical means of turning the brush arrangement is illustrated. A pressure differential sensing switch 80 is placed in series with a power source 82 and an electric motor 84, the motor being connected to the handle member by means of a flexible drive shaft 86. Deposition of contaminant in sufficient quantity to produce a predetermined pressure drop within the filter housing will trip the pressure differential switch causing the circuit to be energized. The motor operates to turn the brush until the original line pressure is restored to de-energize the circuit by opening the differential switch.

In the system of FIGURE 6 the pressure differential switch of FIGURE 5 is replaced by an electric timer 88 which can be set to clean the screen periodically independent of sensing pressure drops. Other means can be readily adapted to supply and control the torque energy required to turn the brush arrangement.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fluid strainer assembly comprising a main housing composed of a header and a cup-shaped lower member, a fixed spindle extending downwardly from said header through the bottom of said member, means on said spindle securing said header and housing member together, a symmetrical filter screen disposed within the housing in surrounding relation to said spindle, means securing the upper end of said screen to the header, means providing a fluid inlet passage through said header opening into the upper end of said filter screen, a scraper rotatably mounted on said spindle with its periphery engaging the inner surface of said screen, and means providing an outlet passage through said header for discharging fluid that has passed through said screen, the bottom of said cup-shaped housing member providing a chamber below the open lower end of said filter screen.

2. The fluid strainer defined in claim 1, wherein said scraper is carried by a sleeve rotatable upon said spindle, and said sleeve is resiliently biased toward the header by spring means compressed between its lower end and the bottom of said housing member.

References Cited

UNITED STATES PATENTS

| | | | |
|---|---|---|---|
| 521,591 | 6/1894 | Lynn | 210—107 X |
| 781,039 | 1/1905 | Weabe | 210—414 |
| 1,510,863 | 10/1924 | Rose | 210—414 X |
| 1,689,277 | 10/1928 | Burns | 210—414 X |
| 1,780,774 | 11/1930 | White | 210—444 X |
| 2,063,742 | 12/1936 | Holmes | 210—308 X |
| 3,168,467 | 2/1965 | Dreyer | 210—138 X |
| 3,262,568 | 7/1966 | Zehrback | 210—138 |
| 536,536 | 3/1895 | Lindsay et al. | 210—415 |

FOREIGN PATENTS

| | | |
|---|---|---|
| 240,291 | 2/1960 | Australia. |
| 19,080 | 2/1905 | Austria. |
| 12,715 | 11/1956 | Germany. |
| 430,290 | 10/1911 | France. |

REUBEN FRIEDMAN, *Primary Examiner.*

SAMIH N. ZAHARNA, *Examiner.*

D. M. RIESS, J. ADEE, *Assistant Examiners.*